(12) United States Patent
Kubo

(10) Patent No.: US 10,609,437 B2
(45) Date of Patent: Mar. 31, 2020

(54) METHOD FOR PROVIDING CONTENT USING A HEAD-MOUNTED DEVICE, SYSTEM FOR EXECUTING THE METHOD, AND CONTENT DISPLAY DEVICE

(71) Applicant: COLOPL, Inc., Tokyo (JP)

(72) Inventor: Norihiro Kubo, Kanagawa (JP)

(73) Assignee: COLOPL, INC., Tokyo (JP)

( * ) Notice: Subject to any disclaimer, the term of this patent is extended or adjusted under 35 U.S.C. 154(b) by 63 days.

(21) Appl. No.: 15/730,488

(22) Filed: Oct. 11, 2017

(65) Prior Publication Data

US 2018/0103284 A1 Apr. 12, 2018

(30) Foreign Application Priority Data

Oct. 12, 2016 (JP) ................. 2016-201035

(51) Int. Cl.
*H04N 21/41* (2011.01)
*G06F 21/31* (2013.01)
(Continued)

(52) U.S. Cl.
CPC ....... *H04N 21/4126* (2013.01); *G02B 27/017* (2013.01); *G06F 1/163* (2013.01);
(Continued)

(58) Field of Classification Search
None
See application file for complete search history.

(56) References Cited

U.S. PATENT DOCUMENTS

2012/0079578 A1\* 3/2012 Dachiraju .......... H04N 21/2225
726/7
2014/0126782 A1 5/2014 Takai et al.
(Continued)

FOREIGN PATENT DOCUMENTS

JP 2007-325231 A 12/2007
JP 2014-92940 A 5/2014
(Continued)

OTHER PUBLICATIONS

How to Use the Xiaomi VR Headset on the HTC 10 (Oct. 8, 2016), gtrusted.com/how-to-use-the-xiaonni-vr-headset-on-the-htc-10 (Year: 2016).\*
Office Action in JP Patent Application No. 2016-201035, dated Jun. 6, 2017, 9pp.
Notice of Allowance in JP Patent Application No. 2016-201035, dated Aug. 1, 2017, 7pp.

*Primary Examiner* — Michael R Telan
(74) *Attorney, Agent, or Firm* — Hauptman Ham, LLP

(57) ABSTRACT

A method of providing content using a head-mounted device. The method includes receiving, by a terminal configured to display a screen for logging in to the application, input of user identification information by a user, wherein the user identification information associates the user with a first application. The method further includes receiving, by the terminal, when authentication using the user identification information is successful, a login key for logging in to a content providing service by the first application. The method further includes transmitting, by the terminal, based on input of a login instruction using the login key by the user wearing the head-mounted device, the login key to a server. The method further includes receiving, by the terminal, from the server, content viewable in a head-mounted display mode following successful authentication using the login key.

21 Claims, 14 Drawing Sheets

(51) Int. Cl.
  *G06F 3/01* (2006.01)
  *H04N 21/4415* (2011.01)
  *H04N 21/475* (2011.01)
  *G06F 1/16* (2006.01)
  *H04N 21/258* (2011.01)
  *H04N 21/422* (2011.01)
  *G02B 27/01* (2006.01)

(52) U.S. Cl.
  CPC .............. *G06F 3/011* (2013.01); *G06F 3/012* (2013.01); *G06F 21/31* (2013.01); *G06F 21/316* (2013.01); *H04N 21/25875* (2013.01); *H04N 21/4122* (2013.01); *H04N 21/42202* (2013.01); *H04N 21/4415* (2013.01); *H04N 21/4753* (2013.01)

(56) References Cited

U.S. PATENT DOCUMENTS

| | | | |
|---|---|---|---|
| 2014/0337634 A1 | 11/2014 | Starner et al. | |
| 2016/0232339 A1 | 8/2016 | Yang et al. | |
| 2016/0300388 A1* | 10/2016 | Stafford | A63F 13/211 |
| 2017/0090556 A1 | 3/2017 | Baba et al. | |
| 2017/0318019 A1* | 11/2017 | Gordon | G06K 9/00617 |

FOREIGN PATENT DOCUMENTS

| | | |
|---|---|---|
| JP | 2016-99702 A | 5/2016 |
| WO | 2016/129549 A1 | 8/2016 |

\* cited by examiner

METHOD FOR PROVIDING CONTENT USING A HEAD-MOUNTED DEVICE, SYSTEM FOR EXECUTING THE METHOD, AND CONTENT DISPLAY DEVICE

RELATED APPLICATIONS

The present application claims priority to Japanese Application Number 2016-201035, filed Oct. 12, 2016, the disclosure of which is hereby incorporated by reference herein in its entirety.

BACKGROUND

This disclosure relates to input to a communication terminal, and more specifically, to input to a communication terminal usable together with a head-mounted device.

There is known a technology of performing user authentication and displaying an image by using a device that can be worn on the head of a user. For example, in Japanese Patent Application Laid-open No. 2014-092940, there is disclosed a technology of "achieving authentication processing of a user wearing an image display apparatus on his or her head or face by using simpler and less expensive means". As disclosed in Japanese Patent Application Laid-open No. 2014-092940, "an operation input unit 601 is configured to detect movement of a gaze position or point of gaze of a user by using an inside camera pointing toward the user's face, or a myoelectric sensor or electrooculogram sensor that detects a muscle potential or an eye potential, respectively, when in contact with the head or face of the user wearing the image display apparatus. A user identifying and authenticating unit 602 can, by using a motion pattern formed from movement of the gaze position or point of gaze of the user, perform user identification and authentication processing based on a degree of matching with a movement pattern of the gaze position or point of gaze stored in advance" (see [Abstract]).

In Japanese Patent Application Laid-open No. 2016-099702, there is disclosed a technology for "reducing an operation burden for smartphone authentication when a user of an eyeglasses-type device (i.e., wearable device) operates a smartphone" (see [Abstract]).

SUMMARY

According to at least one embodiment of this disclosure, there is provided a method for providing content by using a head-mounted device. The method includes receiving, by a terminal configured to display a screen for logging in to an application, input of user identification information by a user of the application. The method further includes receiving, when authentication using the user identification information is successful, a login key for logging in to a content providing service by the application. The method further includes detecting a gaze of the user wearing the head-mounted device. The method further includes transmitting, based on visual recognition of the gaze on a login button configured to receive a login instruction using the login key, the login key to a server configured to manage the content. The method further includes receiving from the server content viewable in a head-mounted display mode based on a determination by the server that authentication using the login key has been successful.

According to at least one embodiment of this disclosure, there is provided a system for executing the above-mentioned method.

According to at least one embodiment of this disclosure, there is provided a content display device including a memory having the above-mentioned program stored thereon and a processor configured to execute the above-mentioned method.

The above-mentioned and other objects, features, aspects, and advantages of technical features to be disclosed may be made clear from the following detailed description of this disclosure, which is to be understood in association with the attached drawings.

DETAILED DESCRIPTION

Now, with reference to the drawings, at least one embodiment of the disclosed technical idea is described in detail. In the following description, like components are denoted by like reference symbols. The same applies to the names and functions of those components. Therefore, detailed description of those components is not repeated.

Figure 1:
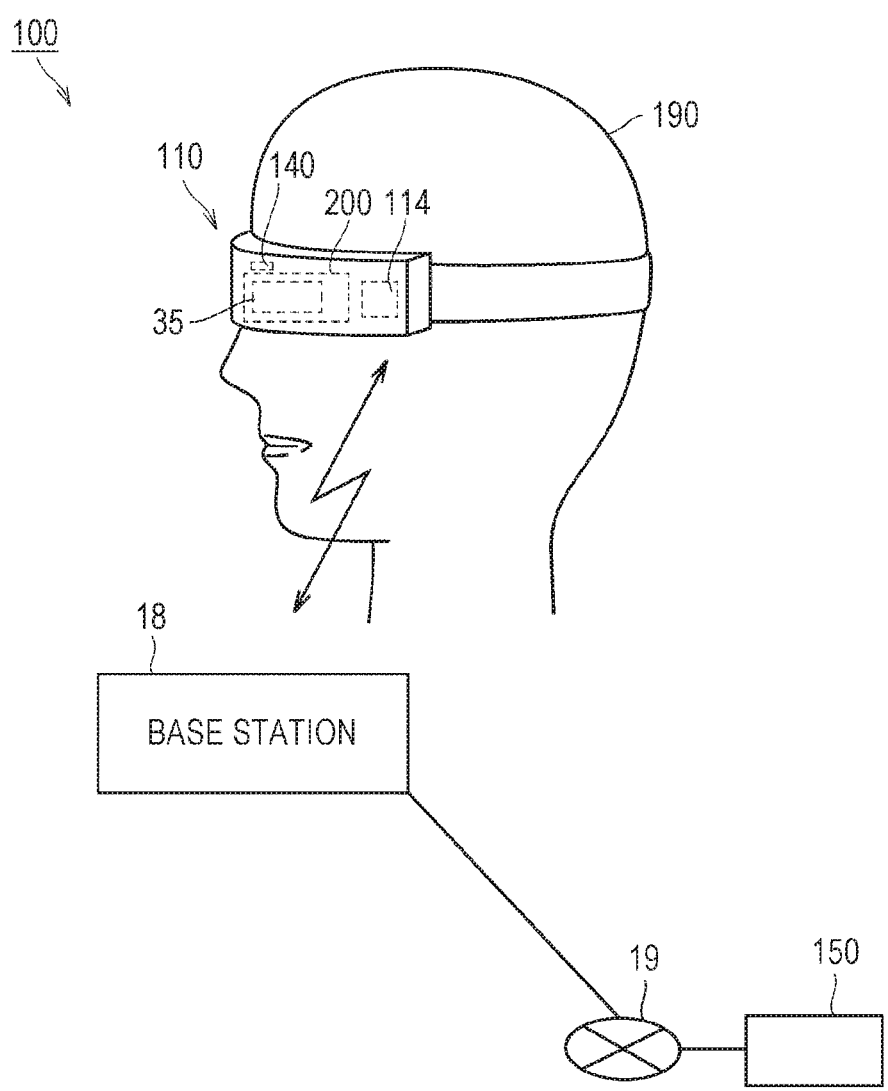
FIG. 1 is a diagram of an overview of a configuration of an HMD system 100 of at least one embodiment of this disclosure.

With reference to FIG. 1, a configuration of a head-mounted device (HMD) system 100 of at least one embodiment of this disclosure is described. FIG. 1 is a diagram of an overview of the configuration of the HMD system 100 of at least one embodiment of this disclosure. In at least one aspect, the HMD system 100 is provided as a system usable for household use or a system usable for professional use. In at least one embodiment, an HMD may include both of a so-called head-mounted display including a monitor and a head-mounted device to which a smartphone or other terminals having a monitor can be mounted.

The HMD system 100 includes an HMD 110 and a server 150. The HMD 110 includes a sensor 114 and an eye gaze sensor 140. A communication terminal 200 can be mounted to the HMD 110. The communication terminal 200 is configured to communicate to/from a base station 18. The base station 18 is connected to the server 150 via the Internet 19 or another wired or wireless connection.

The HMD 110 may be worn on a head of a user to provide a virtual space to the user during operation. More specifically, the HMD 110 displays each of a right-eye image and a left-eye image on a monitor of a smartphone. When each eye of the user visually recognizes the corresponding image, the user may recognize the image as a three-dimensional image based on the parallax of both the eyes.

In at least one aspect, the communication terminal 200 may be mounted to a main body of the HMD 110 such that a monitor of the communication terminal 200 is positioned in front of both the eyes of the user. Therefore, when the user visually recognizes the three-dimensional image displayed on the monitor, the user can be immersed in the virtual space. In at least one embodiment of this disclosure, the virtual space includes, for example, a background, objects that can be operated by the user, menu images that can be selected by the user, or a moving image distributed by the server 150. In at least one embodiment of this disclosure, the monitor may be achieved as a liquid crystal monitor or an organic electroluminescence (EL) monitor.

In at least one aspect, the monitor may include a sub-monitor for displaying a right-eye image and a sub-monitor for displaying a left-eye image. In at least one aspect, the monitor may be configured to integrally display the right-eye image and the left-eye image. In this case, the monitor includes a high-speed shutter. The high-speed shutter operates so as to enable alternate display of the right-eye image and the left-eye image so that only one of the eyes can recognize the image at a specific point in time.

In at least one aspect, the sensor 114 has, as with an HMD sensor (not shown), a position tracking function for detecting movement of the HMD 110. The sensor 114 may detect the position and the inclination of the HMD 110 itself. For example, when the sensor 114 is an angular velocity sensor, a geomagnetic sensor, an acceleration sensor, or a gyrosensor, the HMD 110 may use any of those sensors instead of the HMD sensor to detect the position and the inclination of the HMD 110 itself. As an example, when the sensor 114 is an angular velocity sensor, the angular velocity sensor detects over time the angular velocity about each of three axes of the HMD 110 in the real space. The HMD 110 calculates a temporal change of the angle about each of the three axes of the HMD 110 based on each angular velocity, and further calculates an inclination of the HMD 110 based on the temporal change of the angles. Further, the HMD 110 may include a transmissive display device. In this case, the transmissive display device may be configured as a display device that is temporarily non-transmissive by adjusting the transmittance of the display device. The visual-field image may include a section for presenting a real space on a part of the image forming the virtual space. For example, an image taken by a camera mounted to the HMD 110 may be superimposed and displayed on a part of the visual-field image, or the real space may be visually recognized from a part of the visual-field image by increasing the transmittance of a part of the transmissive display device.

The eye gaze sensor 140 is configured to detect a direction (line-of-sight direction) in which the lines of sight of the right eye and the left eye of a user 190 are directed. The direction is detected by, for example, a known eye tracking function. The eye gaze sensor 140 is achieved by a sensor having the eye tracking function. In at least one aspect, the eye gaze sensor 140 includes a right-eye sensor and a left-eye sensor. The eye gaze sensor 140 may be, for example, a sensor configured to irradiate the right eye and the left eye of the user 190 with infrared light, and to receive reflection light from the cornea and the iris with respect to the irradiation light, to thereby detect a rotational angle of each eyeball. The eye gaze sensor 140 can detect the line-of-sight direction of the user 190 based on each detected rotational angle.

The server 150 is configured to communicate to/from the communication terminal 200 via the Internet 19 or another wired or wireless connection. In at least one aspect, the server 150 distributes a moving image to the communication terminal 200. For example, before mounting the communication terminal 200 to the HMD 110, the user 190 performs a login operation to a service for receiving distribution of the moving image. The login operation is achieved as an ordinary operation like a touch operation on the communication terminal 200.

The server 150 is configured to communicate to/from the communication terminal 200 or other information communication terminal, and to transmit data in accordance with a request from that information communication terminal. Examples of the data to be transmitted may include a moving image, a still image, a voice, or other content data. Examples of a moving image may include a moving image as seen from one direction and a moving image as seen from 360 degrees.

Figure 2:
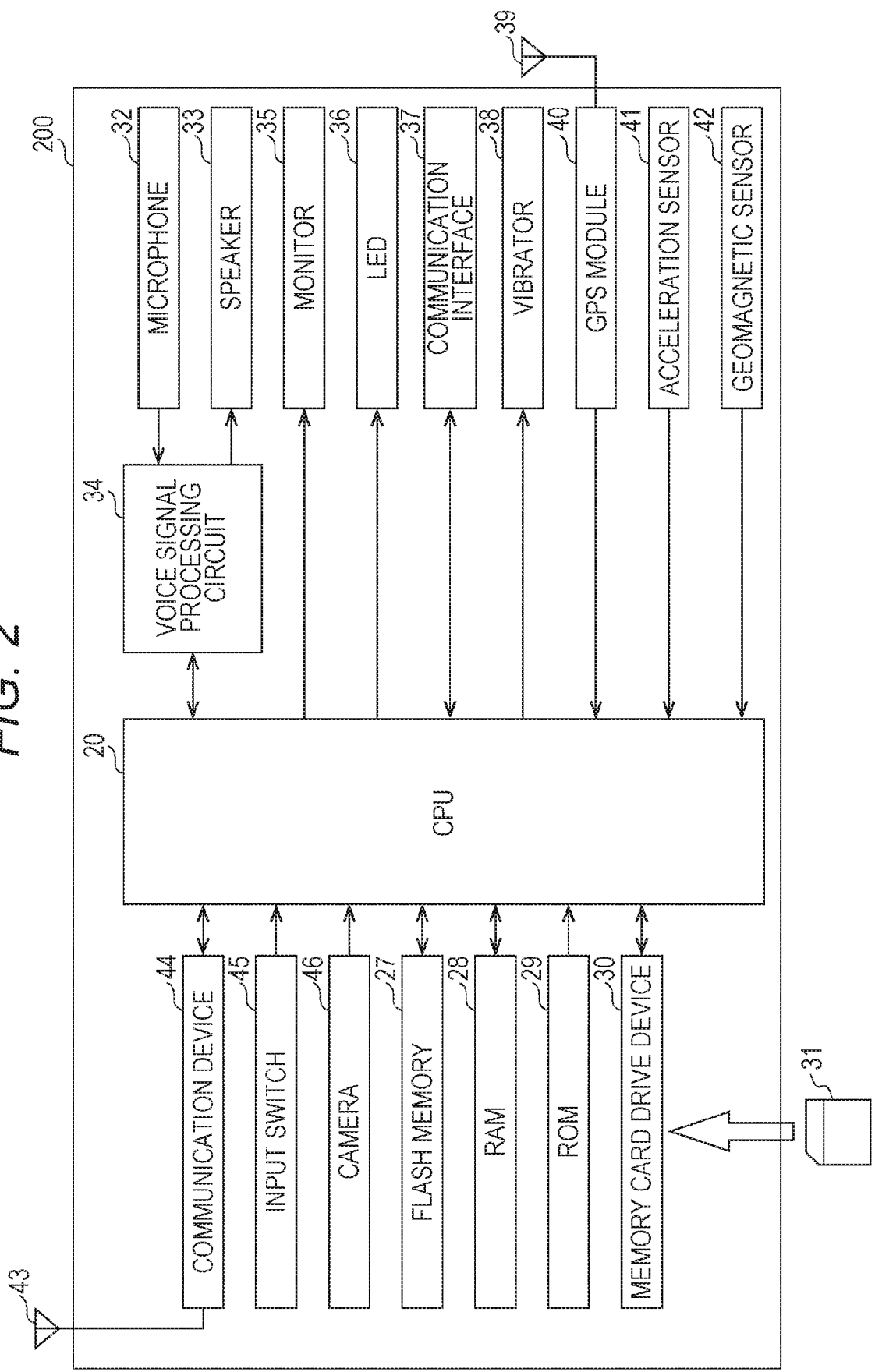
FIG. 2 is a block diagram of a hardware configuration of a communication terminal 200 of at least one embodiment of this disclosure.

A configuration of the communication terminal 200 of at least one embodiment of this disclosure is now described with reference to FIG. 2. FIG. 2 is a block diagram of a hardware configuration of the communication terminal 200 of at least one embodiment of this disclosure.

The communication terminal 200 includes a central processing unit (CPU) 20, an antenna 43, a communication device 44, an input switch 45, a camera 46, a flash memory 27, a random access memory (RAM) 28, a read-only memory (ROM) 29, a memory card drive device 30, a microphone 32, a speaker 33, a voice signal processing circuit 34, a monitor 35, a light emitting diode (LED) 36, a communication interface 37, a vibrator 38, a global positioning system (GPS) antenna 39, a GPS module 40, an acceleration sensor 41, and a geomagnetic sensor 42. The memory card 31 can be mounted to the memory card drive device 30.

The antenna 43 is configured to receive a signal emitted by the base station 18, and to transmit a signal for communicating to/from another communication device via the base station 18. The signal received by the antenna 43 is subjected to front-end processing by the communication device 44, and the processed signal is transmitted to the CPU 20.

The CPU 20 is configured to execute processing for controlling a motion of the communication terminal 200 based on a command issued to the communication terminal

200. When the communication terminal 200 receives a signal, the CPU 20 executes processing defined in advance based on a signal transmitted from the communication device 44, and transmits the processed signal to the voice signal processing circuit 34. The voice signal processing circuit 34 is configured to execute signal processing defined in advance on the signal, and to transmit the processed signal to the speaker 33. The speaker 33 is configured to output a voice based on that signal.

The input switch 45 is configured to receive input of a command to the communication terminal 200. The input switch 45 is achieved by, for example, a touch sensor arranged on the monitor 35, or a button arranged on a body of the communication terminal 200. A signal in accordance with the input command is input to the CPU 20.

The microphone 32 is configured to receive sound spoken into the communication terminal 200, and to transmit a signal corresponding to the spoken sound to the voice signal processing circuit 34. The voice signal processing circuit 34 executes processing defined in advance in order to perform verbal communication based on that signal, and transmits the processed signal to the CPU 20. The CPU 20 converts the signal into data for transmission, and transmits the converted data to the communication device 44. The communication device 44 uses that data to generate a signal for transmission, and transmits the signal to the antenna 43.

The flash memory 27 is configured to store the data transmitted from the CPU 20. The CPU 20 reads the data stored in the flash memory 27, and executes processing defined in advance by using that data.

The RAM 28 is configured to temporarily store data generated by the CPU 20 based on an operation performed on the input switch 45. The ROM 29 is configured to store a program or data for causing the communication terminal 200 to execute an operation determined in advance. The CPU 20 reads the program or data from the ROM 29 to control the operation of the communication terminal 200.

The memory card drive device 30 is configured to read data stored in the memory card 31, and to transmit the read data to the CPU 20. The memory card drive device 30 is also configured to write data output by the CPU 20 in a storage area of the memory card 31.

The voice signal processing circuit 34 is configured to execute signal processing for performing verbal communication like that described above. In FIG. 2, there is a configuration in which the CPU 20 and the voice signal processing circuit 34 are separate, but in at least one aspect, the CPU 20 and the voice signal processing circuit 34 may be integrated.

The monitor 35 is a touch-operation type monitor. However, the mechanism for receiving the touch operation is not particularly limited. The monitor 35 is configured to display, based on data acquired from the CPU 20, an image defined by the data. For example, the monitor 35 displays content for the left eye and the right eye of the user of the communication terminal 200 based on data downloaded to the RAM 28. Examples of the content may include a still image, a moving image, and a map.

The LED 36 is configured to emit light based on a signal output from the CPU 20. In at least one aspect, the communication interface 37 is achieved by, for example, WiFi, Bluetooth®, or near field communication (NFC). In at least one aspect, a cable for data communication may be mounted to the communication interface 37. The communication interface 37 is configured to emit a signal output from the CPU 20. The communication interface 37 may also be configured to transmit to the CPU 20 data included in a signal received from outside the communication terminal 200.

The vibrator 38 is configured to execute a vibrating motion at a frequency determined in advance based on a signal output from the CPU 20.

The GPS antenna 39 is configured to receive GPS signals transmitted from four or more satellites. Each of the received GPS signals is input to the GPS module 40. The GPS module 40 is configured to acquire position information on the communication terminal 200 by using each GPS signal and a known technology to execute positioning processing.

The acceleration sensor 41 is configured to detect acceleration acting on the communication terminal 200. In at least one aspect, the acceleration sensor 41 is achieved as a three-axis acceleration sensor. The detected acceleration is input to the CPU 20. The CPU 20 detects a movement and a posture (inclination) of the communication terminal 200 based on the input acceleration.

The geomagnetic sensor 42 is configured to detect the direction in which the communication terminal 200 is facing. Information acquired by the detection is input to the CPU 20.

[Hardware Configuration of Server 150]

Figure 3:
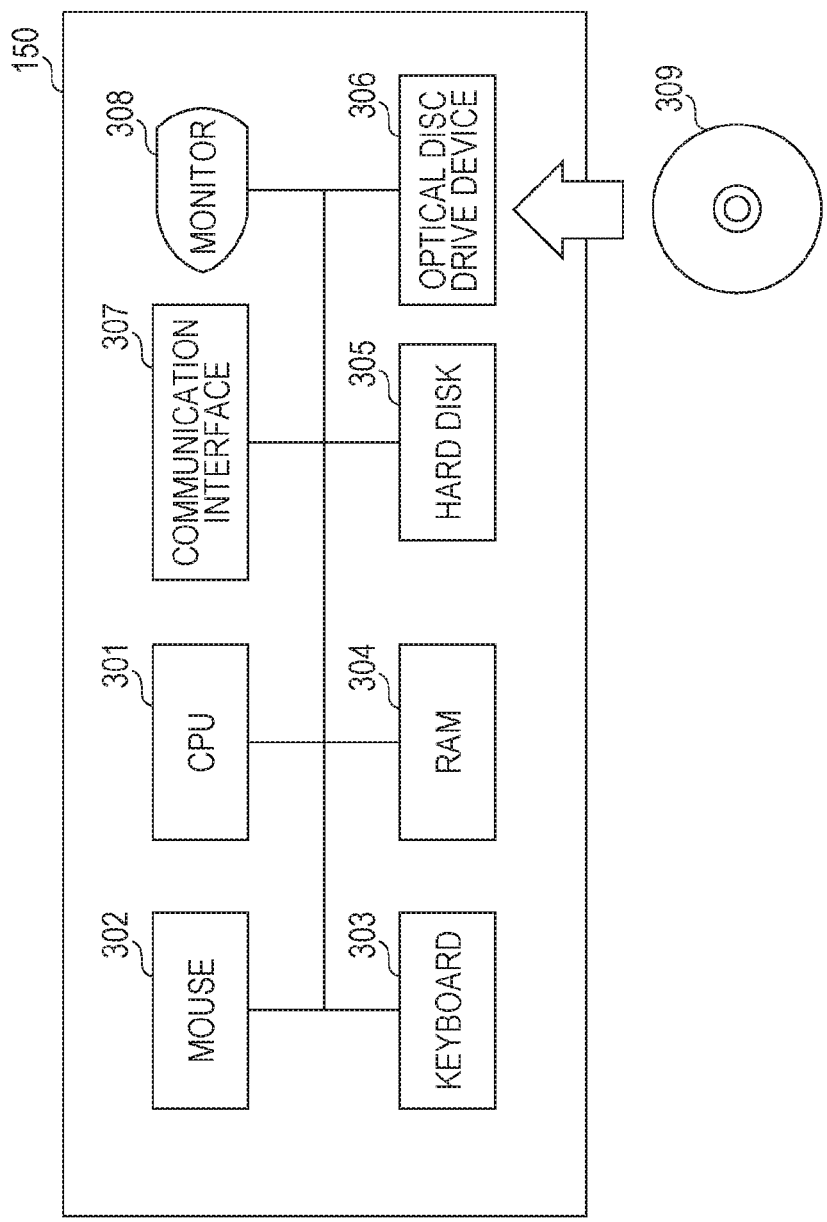
FIG. 3 is a block diagram of an example of a hardware configuration of a server 150 of at least one embodiment of this disclosure.

A configuration of the server 150 is now described with reference to FIG. 3. FIG. 3 is a block diagram of a hardware configuration of the server 150 in at least one aspect. The server 150 is managed by, for example, a business operator for providing an application program that can be used in a region determined in advance in order to achieve augmented (or virtual) reality.

The server 150 includes, as main components, a CPU 301 configured to execute a program, a mouse 302 and a keyboard 303 configured to receive input of instructions by a user of the server 150, a RAM 304 configured to store in a volatile manner data generated by execution of a program by the CPU 301 or data input via the mouse 302 or the keyboard 303, a hard disk 305 configured to store data in a non-volatile manner, an optical disc drive device 306, a monitor 308, and a communication interface 307. Each component is connected to the other components via a bus. A compact disc read-only memory (CD-ROM) or other optical disc is mounted to the optical disc drive device 306. Examples of the communication interface 307 include a universal serial bus (USB) interface, a wired local area network (LAN), a wireless LAN, and a Bluetooth® ® interface, but the communication interface 307 is not limited thereto.

The processing by the server 150 is achieved by hardware and by software executed by the CPU 301. The software may be stored in advance on the hard disk 305. The software may also be stored on the CD-ROM 309 or other computer-readable non-volatile data recording medium to be distributed as a program product. The software may also be provided as a program product that can be downloaded by an information provider connected to the Internet or other network. Such software is read from the optical disc drive device 306 or other data reading device, or is downloaded via the communication interface 307 and then temporarily stored in the hard disk 305. The software is read from the hard disk 305 by the CPU 301, and is stored in the RAM 304 in a format that is executable by the program. The CPU 301 executes that program.

Each component constructing the server 150 in FIG. 3 is a hardware component. Therefore, a part of at least one embodiment can be said to be the execution of the program stored in the server 150. The operation of each hardware component included in the server 150 is known, and hence a detailed description thereof is omitted for the sake of brevity.

The data recording medium is not limited to a CD-ROM, a flexible disk (FD), and a hard disk. The data recording medium may also be a non-volatile data recording medium configured to store a program in a fixed manner, for example, a magnetic tape, a cassette tape, an optical disc (i.e., magnetic optical (MO) disc, mini disc (MD), or digital versatile disc (DVD)), and an integrated circuit (IC) card (including a memory card), an optical card, a mask ROM, an electronically programmable read-only memory (EPROM), an electronically erasable programmable read-only memory (EEPROM), and a flash ROM.

The term "program" referred to here does not only include a program that can be directly executed by the CPU 301. The program may also be a program in a source program format, a compressed program, or an encrypted program, for example.

[Uvw Visual-Field Coordinate System]

Figure 4:
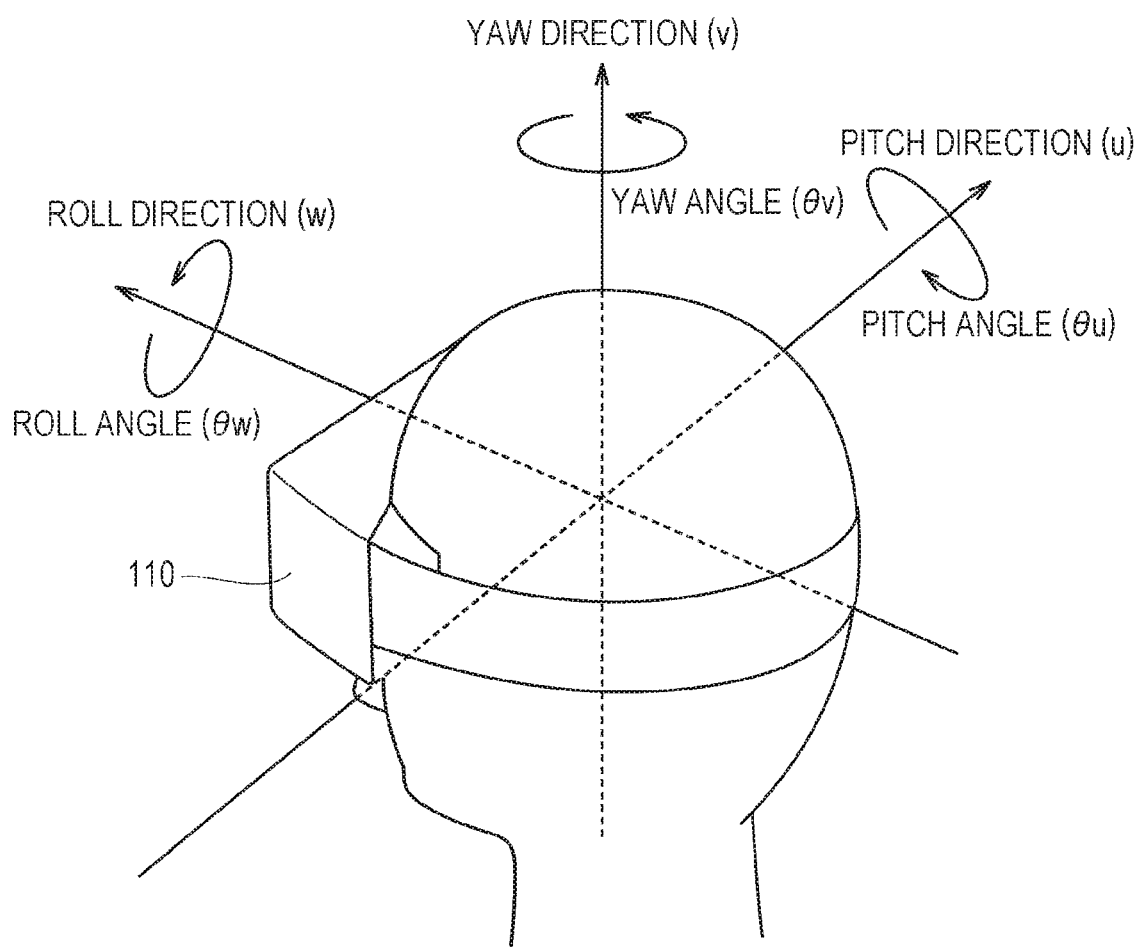
FIG. 4 is a diagram of a uvw visual-field coordinate system to be set for an HMD 110 of at least one embodiment of this disclosure.

With reference to FIG. 4, the uvw visual-field coordinate system is described. FIG. 4 is a diagram of a uvw visual-field coordinate system to be set for the HMD 110 of at least one embodiment of this disclosure. The sensor 114 detects the position and the inclination of the HMD 110 in the global coordinate system when the HMD 110 is activated. The processor 10 sets the uvw visual-field coordinate system to the HMD 110 based on the detected values.

In FIG. 4, the HMD 110 sets the three-dimensional uvw visual-field coordinate system defining the head of the user wearing the HMD 110 as a center (origin). More specifically, the HMD 110 sets three directions newly obtained by inclining the horizontal direction, the vertical direction, and the front-rear direction (x axis, y axis, and z axis), which define the global coordinate system, about the respective axes by the inclinations about the respective axes of the HMD 110 in the global coordinate system as a pitch direction (u axis), a yaw direction (v axis), and a roll direction (w axis) of the uvw visual-field coordinate system in the HMD 110.

In at least one aspect, when the user 190 wearing the HMD 110 is standing upright and is visually recognizing the front side, the processor 10 sets the uvw visual-field coordinate system that is parallel to the global coordinate system to the HMD 110. In this case, the horizontal direction (x axis), the vertical direction (y axis), and the front-rear direction (z axis) of the global coordinate system directly match the pitch direction (u axis), the yaw direction (v axis), and the roll direction (w axis) of the uvw visual-field coordinate system in the HMD 110.

After the uvw visual-field coordinate system is set to the HMD 110, the sensor 114 can detect the inclination (change amount of the inclination) of the HMD 110 in the uvw visual-field coordinate system that is set based on the movement of the HMD 110. In this case, the sensor 114 detects, as the inclination of the HMD 110, each of a pitch angle ($8u$), a yaw angle ($8v$), and a roll angle ($8w$) of the HMD 110 in the uvw visual-field coordinate system. The pitch angle ($8u$) represents an inclination angle of the HMD 110 about the pitch direction in the uvw visual-field coordinate system. The yaw angle ($\theta v$) represents an inclination angle of the HMD 110 about the yaw direction in the uvw visual-field coordinate system. The roll angle ($\theta w$) represents an inclination angle of the HMD 110 about the roll direction in the uvw visual-field coordinate system.

The sensor 114 sets, to the HMD 110, the uvw visual-field coordinate system of the HMD 110 obtained after the movement of the HMD 110 based on the detected inclination angle of the HMD 110. The relationship between the HMD 110 and the uvw visual-field coordinate system of the HMD 110 is always constant regardless of the position and the inclination of the HMD 110. When the position and the inclination of the HMD 110 change, the position and the inclination of the uvw visual-field coordinate system of the HMD 110 in the global coordinate system change in synchronization with the change of the position and the inclination.

In at least one aspect, the sensor 114 may specify the position of the HMD 110 in the real space as a position relative to the sensor 114 based on the light intensity of the infrared ray or a relative positional relationship between a plurality of points (e.g., a distance between the points), which is acquired based on output from the infrared sensor. Further, the processor 10 may determine the origin of the uvw visual-field coordinate system of the HMD 110 in the real space (global coordinate system) based on the specified relative position.

[Virtual Space]

Figure 5:
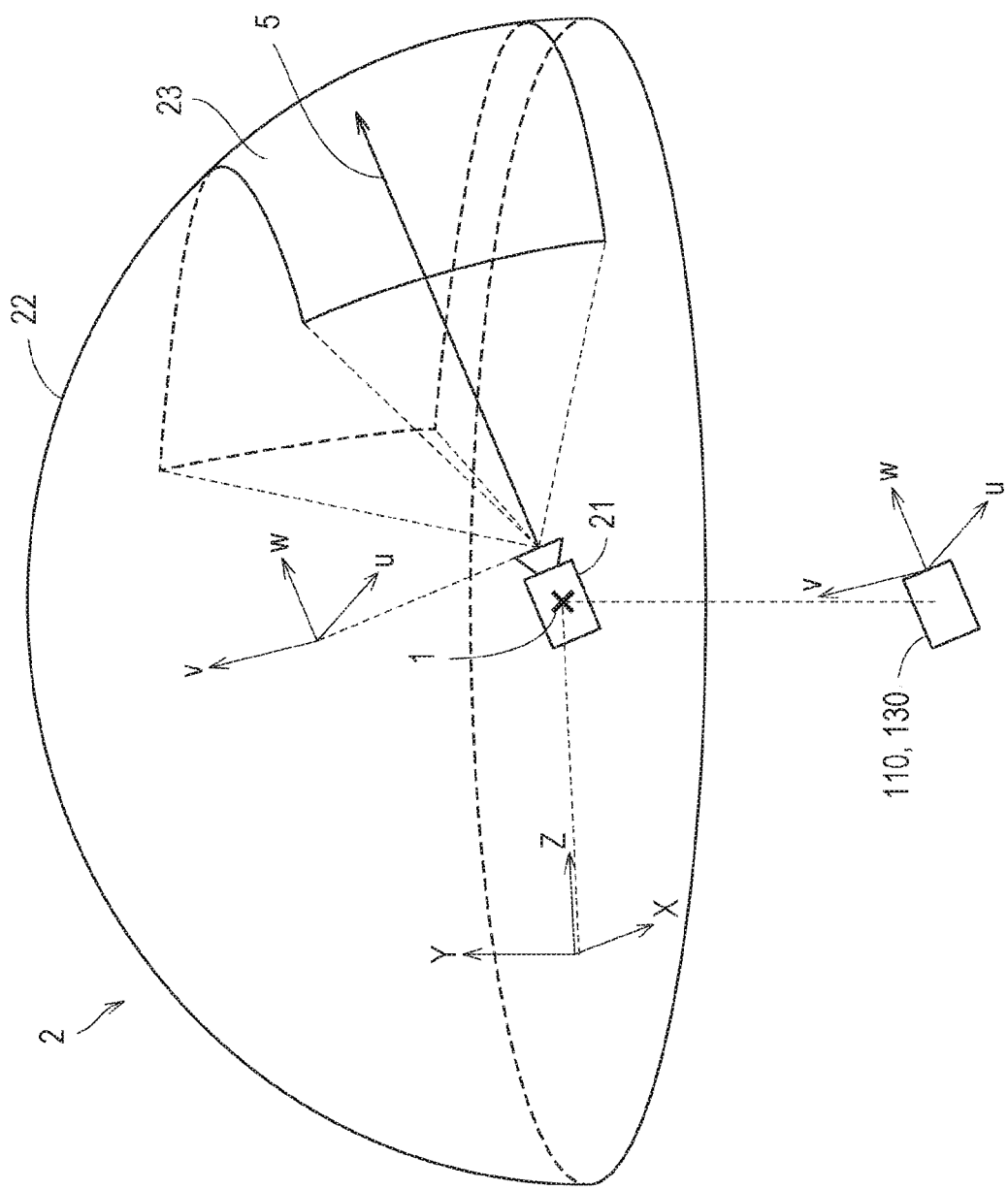
FIG. 5 is a diagram of a virtual space 2 of at least one embodiment of this disclosure.

With reference to FIG. 5, the virtual space is further described. FIG. 5 is a diagram of a virtual space 2 of at least one embodiment of this disclosure. The virtual space 2 has a structure with an entire celestial sphere shape covering a center 21 in all 360-degree directions. In FIG. 5, for the sake of clarity, only the upper-half celestial sphere of the virtual space 2 is shown. Each mesh section is defined in the virtual space 2. The position of each mesh section is defined in advance as coordinate values in an XYZ coordinate system defined in the virtual space 2. The server 150 associates each partial image forming content (e.g., still image or moving image) that can be developed in the virtual space 2 with each corresponding mesh section in the virtual space 2, to thereby provide, to the user, the virtual space 2 in which a virtual space image 22 that can be visually recognized by the user is developed.

In at least one aspect, in the virtual space 2, the XYZ coordinate system having the center 21 as the origin is defined. The XYZ coordinate system is, for example, parallel to the global coordinate system. The XYZ coordinate system is one type of the point-of-view coordinate system, and hence the horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the global coordinate system, the Y axis (vertical direction) of the XYZ coordinate system is parallel to the y axis of the global coordinate system, and the Z axis (front-rear direction) of the XYZ coordinate system is parallel to the z axis of the global coordinate system.

When the HMD 110 is activated, that is, when the HMD 110 is in an initial state, a virtual camera 1 is arranged at the center 21 of the virtual space 2. In synchronization with the movement of the HMD 110 in the real space, the virtual camera 1 similarly moves in the virtual space 2. With this, the change in position and direction of the HMD 110 in the real space is reproduced similarly in the virtual space 2.

The uvw visual-field coordinate system is defined in the virtual camera 1 similarly to the case of the HMD 110. The uvw visual-field coordinate system of the virtual camera in the virtual space 2 is defined to be synchronized with the uvw visual-field coordinate system of the HMD 110 in the real space (global coordinate system). Therefore, when the inclination of the HMD 110 changes, the inclination of the virtual camera 1 also changes in synchronization therewith.

The virtual camera 1 can also move in the virtual space 2 in synchronization with the movement of the user wearing the HMD 110 in the real space.

The direction of the virtual camera 1 is determined based on the position and the inclination of the virtual camera 1, and hence a line of sight (reference line of sight 5) serving as a reference when the user visually recognizes the virtual space image 22 is determined based on the direction of the virtual camera 1. The processor 10 of the server 150 defines a field-of-view region 23 in the virtual space 2 based on the reference line of sight 5. The field-of-view region 23 corresponds to a field of view of the user wearing the HMD 110 in the virtual space 2.

The line-of-sight direction of the user 190 detected by the eye gaze sensor 140 is a direction in the point-of-view coordinate system obtained when the user 190 visually recognizes an object. The uvw visual-field coordinate system of the HMD 110 is equal to the point-of-view coordinate system used when the user 190 visually recognizes the monitor 35. Further, the uvw visual-field coordinate system of the virtual camera 1 is synchronized with the uvw visual-field coordinate system of the HMD 110. Therefore, in the HMD system 100 in one aspect, the line-of-sight direction of the user 190 detected by the eye gaze sensor 140 can be regarded as the user's line-of-sight direction in the uvw visual-field coordinate system of the virtual camera 1.

[Line-of-Sight of User]

Figure 6:
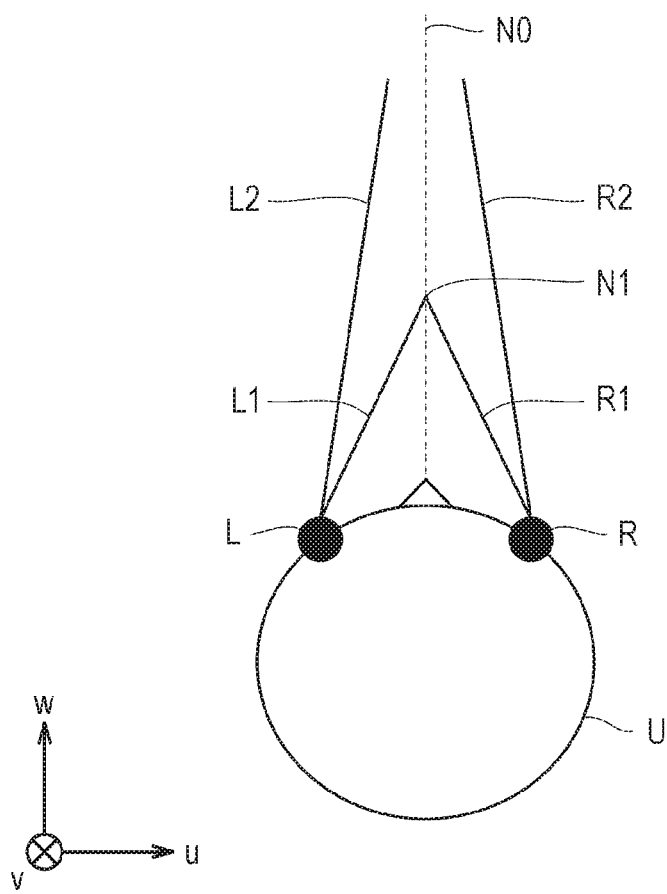
FIG. 6 is a plan view diagram of a head of a user 190 wearing the HMD 110 of at least one embodiment of this disclosure.

With reference to FIG. 6, determination of the user's line-of-sight direction is described. FIG. 6 is a plan view diagram of the head of the user 190 wearing the HMD 110 of at least one embodiment of this disclosure.

In at least one aspect, the eye gaze sensor 140 detects lines of sight of the right eye and the left eye of the user 190. In at least one aspect, when the user 190 is looking at a near place, the eye gaze sensor 140 detects lines of sight R1 and L1. In at least one aspect, when the user 190 is looking at a far place, the eye gaze sensor 140 detects lines of sight R2 and L2. In this case, the angles formed by the lines of sight R2 and L2 with respect to the roll direction w are smaller than the angles formed by the lines of sight R1 and L1 with respect to the roll direction w. The eye gaze sensor 140 transmits the detection results to the computer.

When the computer receives the detection values of the lines of sight R1 and L1 from the eye gaze sensor 140 as the detection results of the lines of sight, the server 150 specifies a point of gaze N1 being an intersection of both the lines of sight R1 and L1 based on the detection values. Meanwhile, when the server 150 receives the detection values of the lines of sight R2 and L2 from the eye gaze sensor 140, the server 150 specifies an intersection of both the lines of sight R2 and L2 as the point of gaze. The server 150 specifies a line-of-sight direction N0 of the user 190 based on the specified point of gaze N1. The server 150 detects, for example, an extension direction of a straight line that passes through the point of gaze N1 and a midpoint of a straight line connecting a right eye R and a left eye L of the user 190 to each other as the line-of-sight direction N0. The line-of-sight direction N0 is a direction in which the user 190 actually directs his or her lines of sight with both eyes. Further, the line-of-sight direction N0 corresponds to a direction in which the user 190 actually directs his or her lines of sight with respect to the field-of-view region 23.

In at least one aspect, the HMD system 100 may include microphones and speakers in any part constructing the HMD system 100. When the user speaks to the microphone, an instruction can be given to the virtual space 2 with voice.

Further, in at least one aspect, the HMD system 100 may include a television broadcast reception tuner. With such a configuration, the HMD system 100 can display a television program in the virtual space 2.

In at least one aspect, the HMD system 100 may include a communication circuit for connecting to the Internet or have a verbal communication function for connecting to a telephone line.

[Field-of-View Region]

Figure 7:
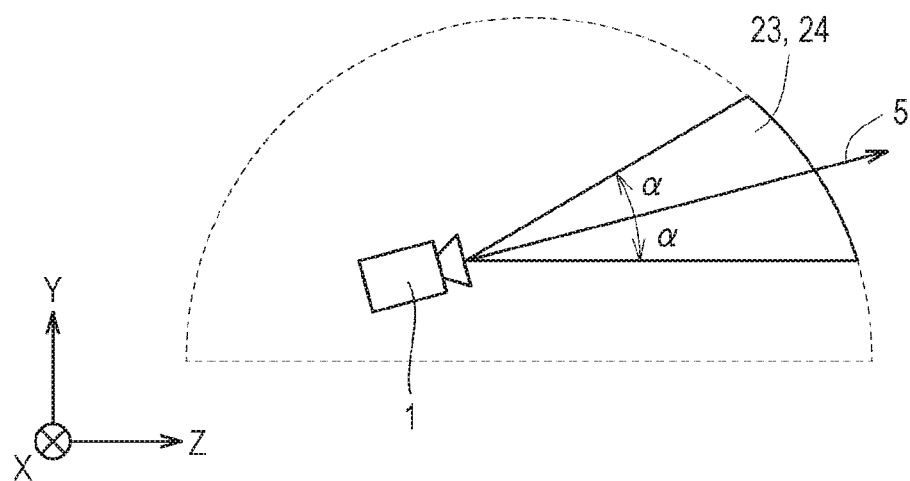
FIG. 7 is a diagram of a YZ cross section obtained by viewing a field-of-view region 23 from an X direction in the virtual space 2 of at least one embodiment of this disclosure.
Figure 8:
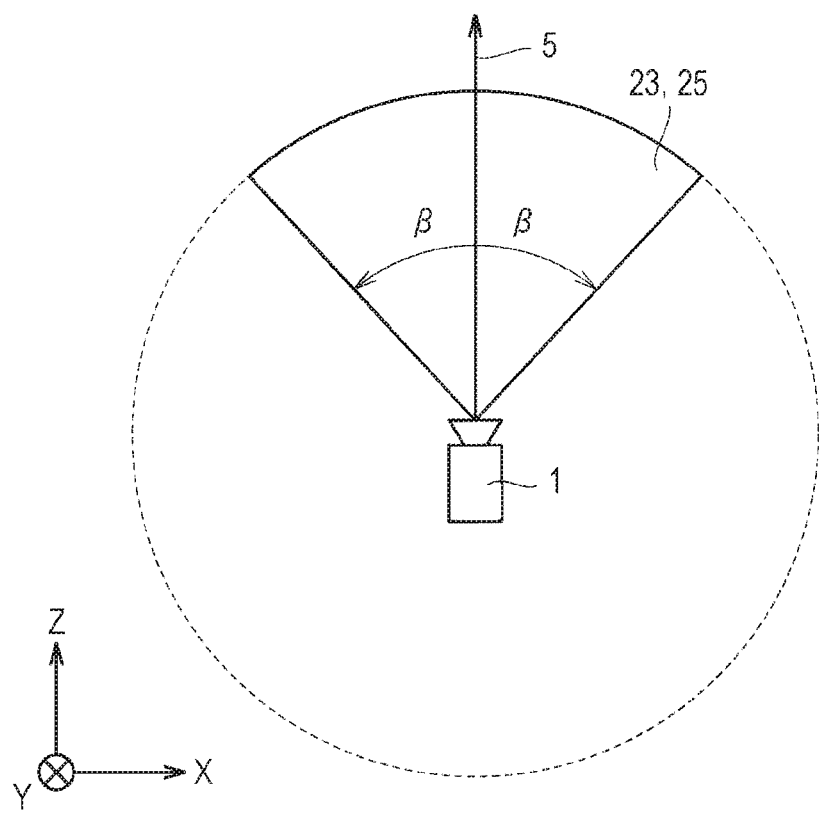
FIG. 8 is a diagram of an XZ cross section obtained by viewing the field-of-view region 23 from a Y direction in the virtual space 2 of at least one embodiment of this disclosure.

With reference to FIG. 7 and FIG. 8, the field-of-view region 23 is described. FIG. 7 is a diagram of a YZ cross section obtained by viewing the field-of-view region 23 from an X direction in the virtual space 2 of at least one embodiment of this disclosure. FIG. 8 is a diagram of an XZ cross section obtained by viewing the field-of-view region 23 from a Y direction in the virtual space 2 of at least one embodiment of this disclosure.

In FIG. 7, the field-of-view region 23 in the YZ cross section includes a region 24. The region 24 is defined by the reference line of sight 5 of the virtual camera 1 and the YZ cross section of the virtual space 2. The processor 10 defines a range of a polar angle α from the reference line of sight 5 serving as the center in the virtual space as the region 24.

In FIG. 8, the field-of-view region 23 in the XZ cross section includes a region 25. The region 25 is defined by the reference line of sight 5 and the XZ cross section of the virtual space 2. The processor 10 defines a range of an azimuth β from the reference line of sight 5 serving as the center in the virtual space 2 as the region 25.

In at least one aspect, the HMD system 100 causes the monitor 35 to display a field-of-view image based on the signal from the computer, to thereby provide the virtual space to the user 190. The field-of-view image corresponds to a part of the virtual space image 22, which is superimposed on the field-of-view region 23. When the user 190 moves the HMD 110 worn on his or her head, the virtual camera 1 is also moved in synchronization with the movement. As a result, the position of the field-of-view region 23 in the virtual space 2 is changed. With this, the field-of-view image displayed on the monitor 35 is updated to an image that is superimposed on the field-of-view region 23 of the virtual space image 22 in a direction in which the user faces in the virtual space 2. The user can visually recognize a desired direction in the virtual space 2.

While the user 190 is wearing the HMD 110, the user 190 cannot visually recognize the real world but can visually recognize only the virtual space image 22 developed in the virtual space 2. Therefore, the HMD system 100 can provide a high sense of immersion in the virtual space 2 to the user.

In at least one aspect, the processor 10 may move the virtual camera 1 in the virtual space 2 in synchronization with the movement in the real space of the user 190 wearing the HMD 110. In this case, the processor 10 specifies an image region to be projected on the monitor 35 of the HMD 110 (that is, the field-of-view region 23 in the virtual space 2) based on the position and the direction of the virtual camera 1 in the virtual space 2.

According to at least one embodiment of this disclosure, the virtual camera 1 includes two virtual cameras, that is, a virtual camera for providing a right-eye image and a virtual camera for providing a left-eye image. Further, in at least one embodiment, an appropriate parallax is set for the two virtual cameras so that the user 190 can recognize the three-dimensional virtual space 2. In at least one embodiment, a technical idea of this disclosure is exemplified assuming that the virtual camera 1 includes two virtual cameras, and the roll directions of the two virtual cameras are synthesized so that the generated roll direction (w) is adapted to the roll direction (w) of the HMD 110.

[Server for Distributing Moving Image]

Figure 9:
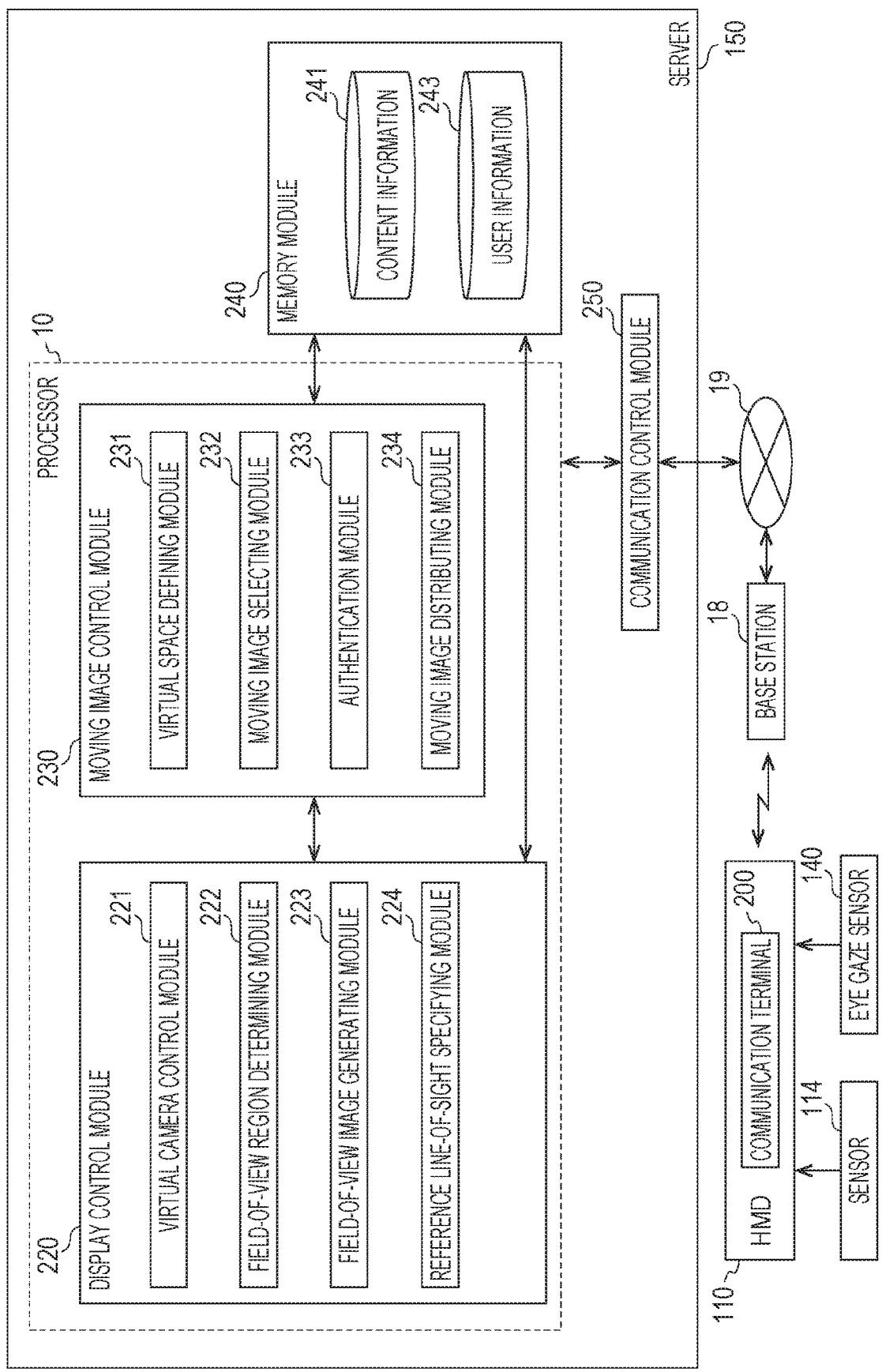
FIG. 9 is a block diagram of a configuration of functions to be achieved by the server 150 of at least one embodiment of this disclosure.

The server 150 configured to distribute a moving image in at least one embodiment of this disclosure is now described with reference to FIG. 9. FIG. 9 is a block diagram of a configuration of functions to be achieved by the server 150 of at least one embodiment of this disclosure. In at least one aspect, the server 150 includes a computer having a configuration determinable by one of ordinary skill in the art.

In FIG. 9, the server 150 includes a display control module 220, a moving image control module 230, a memory module 240, and a communication control module 250. The display control module 220 includes, as sub-modules, a virtual camera control module 221, a field-of-view region determining module 222, a field-of-view image generating module 223, and a reference line-of-sight specifying module 224.

In at least one embodiment of this disclosure, the display control module 220 and the moving image control module 230 are implemented by the processor 10. In at least one embodiment of this disclosure, a plurality of processors may cooperate as the display control module 220 and the moving image control module 230. The memory module 240 is achieved by storage devices such as the RAM 304 and the hard disk 305. The communication control module 250 is achieved by the communication interface 307.

In at least one aspect, the display control module 220 is configured to generate an image to be displayed on the monitor 35 of the communication terminal 200. The virtual camera control module 221 is configured to arrange the virtual camera 1 in the virtual space 2, and control the behavior, the direction, and the like of the virtual camera 1. The field-of-view region determining module 222 is configured to define the field-of-view region 23 in accordance with the direction of the head of the user 190 wearing the HMD 110. The field-of-view image generating module 223 is configured to generate the field-of-view image to be displayed on the monitor 35 based on the determined field-of-view region 23. The reference line-of-sight specifying module 224 is configured to specify the line of sight of the user 190 based on the signal from the eye gaze sensor 140.

The moving image control module 230 is configured to control distribution of a moving image in accordance with a request from each user. More specifically, in at least one aspect, the virtual space control module 230 includes a virtual space defining module 231, a moving image selecting module 232, an authentication module 233, and a moving image distributing module 234.

The virtual space defining module 231 is configured to generate data for displaying the virtual space to be provided to the communication terminal 200. When the moving image to be distributed relates to the real space, the virtual space defining module 231 can generate data for displaying the real space from a 360-degree direction.

The moving image selecting module 232 is configured to read moving image data designated by the user 190 of the communication terminal 200 from content information 241 stored in the memory module 240.

The authentication module 233 is configured to determine, based on authentication information transmitted from the communication terminal 200 and user information 243, whether or not a request for moving image distribution is a request from a validly registered user.

The moving image distributing module 234 is configured to distribute content to the communication terminal of a specific user in accordance with a result of the authentication by the authentication module 233. For example, the moving image distributing module 234 is configured to transmit, when the request is a request from a valid user, the data of the content designated by the user to the communication terminal 200 being used by that user. When the communication terminal 200 receives the data, the communication terminal 200 plays a moving image based on that data.

The memory module 240 is configured to store data for achieving a content providing service to each communication terminal. In at least one aspect, the memory module 240 stores the content information 241 and the user information 243. The content information 241 includes one or more pieces of image data to be distributed in accordance with a request from a user. The image data may be any one of moving image data and still image data.

The user information 243 includes account information on each user registered for the purpose of receiving an image distribution service provided by the HMD system 100. The account information includes, for example, a name, an identification number, a password, and other attributes of the user. When a user accesses a website determined in advance via the communication terminal 200 in order to receive the distribution service, and inputs each of the above-mentioned pieces of the account information, each of the input pieces of information is stored in the user information 243.

The communication control module 250 may communicate to/from the communication terminal 200 or other information communication devices via the Internet 19 or another wired or wireless connection.

In at least one aspect, the display control module 220 or the moving image control module 230 may be implemented by use of, for example, Unity® provided by Unity Technologies. In at least one aspect, the display control module 220 or the moving image control module 230 may also be implemented by combining circuit elements for achieving each step of processing.

The processing performed by the server 150 is implemented by hardware and software executed by the processor 10. The software may be stored in advance on the hard disk 305, a flash memory, or other memory module 240. The software may also be stored on a compact disc read-only memory (CD-ROM) or other computer-readable non-volatile data recording medium, and distributed as a program product. The software may also be provided as a program product that can be downloaded by an information provider connected to the Internet or other network. Such software is read from the data recording medium by an optical disc drive device or other data reading device, or is downloaded from the server 150 or other computer via the communication control module 250 and then temporarily stored in a storage module. The software is read from the storage module by the processor 10, and is stored in a RAM in a format of an executable program. The processor 10 executes that program.

The hardware constructing the server 150 is hardware. Therefore, a part of at least one embodiment is related to the implementation of the program stored in the server 150. The operations of the hardware of the server 150 are known, and hence a detailed description thereof is omitted here.

The data recording medium is not limited to a CD-ROM, a flexible disk (FD), and a hard disk. The data recording medium may also be a non-volatile data recording medium configured to store a program in a fixed manner, for example, a magnetic tape, a cassette tape, an optical disc (magnetic optical (MO) disc, mini disc (MD), or digital versatile disc (DVD)), an integrated circuit (IC) card (including a memory card), an optical card, and semiconductor memories such as a mask ROM, an electronically programmable read-only memory (EPROM), an electronically erasable programmable read-only memory (EEPROM), and a flash ROM.

The term "program" referred to herein does not only include a program that can be directly executed by the processor 10. The program may also include a program in a source program format, a compressed program, or an encrypted program, for example.

[Control Structure]

Figure 10:
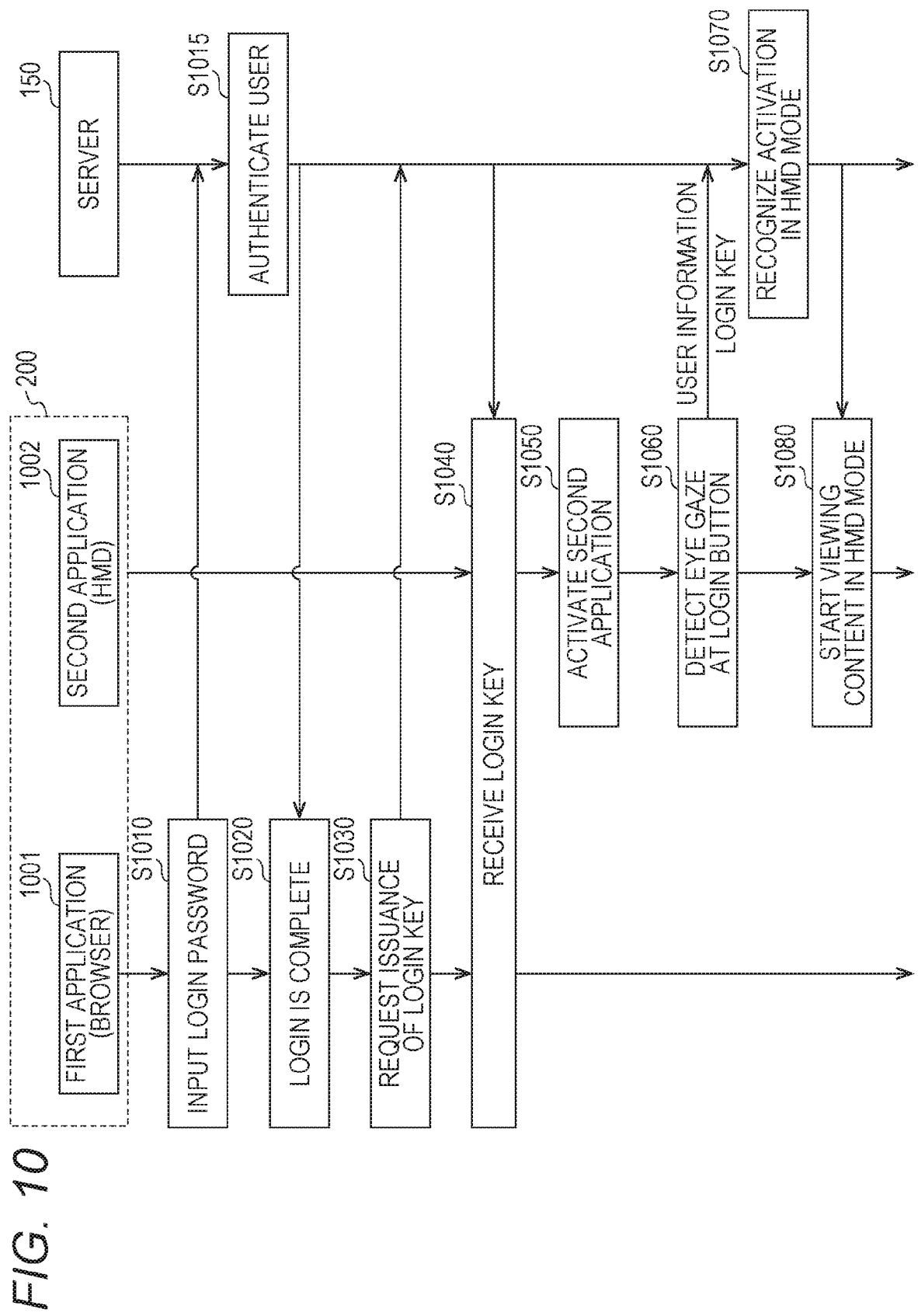
FIG. 10 is a flowchart of processing to be executed by the server 150 and the communication terminal 200 constructing the HMD system 100 of at least one embodiment of this disclosure.

Operation of the HMD system 100 is now described with reference to FIG. 10. FIG. 10 is a flowchart f of processing to be executed by the server 150 and the communication terminal 200 constructing the HMD system 100 of at least one embodiment of this disclosure.

In Step S1010, the CPU 20 of the communication terminal 200 activates a first application (e.g., browser) 1001 based on an operation by the user 190 of the communication terminal 200 or a setting defined in advance. At this point, the communication terminal 200 is not mounted to the HMD 110. The CPU 20 generates instructions for displaying, based on an operation by the user 190, a screen for providing a service for distributing a 360-degree moving image on the monitor 35. The CPU 20 also receives input of a password for logging in to a user account of a website providing the service. The CPU 20 transmits the input password to the server 150 via a communication line. In at least one embodiment, the password includes alphanumeric information, biometric information or other suitable information.

In Step S1015, the CPU 301 of the server 150 authenticates the user 190 of the communication terminal 200 based on the password received from the communication terminal 200 and a password registered as the user information 243. When the user 190 of the communication terminal 200 is validly registered in the server 150, the server 150 transmits to the communication terminal 200 a message indicating that login is complete. When the user 190 of the communication terminal 200 is not validly registered in the server 150, the server 150 transmits to the communication terminal 200 a message indicating that login has failed.

In Step S1020, when the communication terminal 200 receives a message from the server 150, the communication terminal 200 displays on the monitor 35 the message indicating that login is complete.

In Step S1030, in response to a user operation, the communication terminal 200 transmits to the server 150 an issuance request for a login key. In at least one aspect, the login key is used for receiving provision of a moving image distribution service by using a virtual reality (VR) application. The login key is, for example, input to an application to be used by the HMD 110. When the server 150 receives the issuance request from the communication terminal 200, the server 150 transmits the login key to the communication terminal 200.

In Step S1040, the communication terminal 200 receives the login key transmitted from the server 150. In at least one aspect, the login key can be used by the first application 1001 and a second application 1002. For example, the first application 1001 corresponds to the browser, and the second application 1002 corresponds to the VR application to be used by the HMD 110. When the user 190 mounts the communication terminal 200 to the HMD 110, the CPU 20 detects contact between a terminal of the communication terminal 200 and a terminal of the HMD 110, to thereby detect that the communication terminal 200 has been mounted to the HMD 110.

In Step S1050, the CPU 20 activates the second application 1002. The operating mode of the communication terminal 200 switches from a normal mode to an HMD mode.

In Step S1060, the CPU 20 detects, based on output from the eye gaze sensor 140, that a login button is being gazed at. In response to that detection, the communication terminal 200 transmits the user information and the login key to the server 150. The trigger for transmitting the user information and the login key to the server 150 is not limited to detection of the login button as having been gazed at by the user 190. In at least one aspect, for example, input from a controller (not shown) operated by the user 190 may be used as the trigger for transmitting the user information and login key. In at least one aspect, the trigger for transmitting the user information and login key may be a hand movement performed under a state in which a hand device (not shown), for example, is worn on a hand of the user 190.

In Step S1070, when the server 150 receives the user information and the login key from the communication terminal 200, the server 150 recognizes that the communication terminal 200 is activated in the HMD mode. The server 150 then transmits a selected moving image data to the communication terminal 200.

In Step S1080, when the communication terminal 200 receives the moving image data from the server 150, the communication terminal 200 displays content based on that moving image data in the HMD mode, and the user starts viewing the content.

Display modes of the screen on the communication terminal 200 are now described with reference to FIG. 11 to FIG. 14. FIG. 11 to FIG. 14 are each a diagram of an example of a transition of a screen displayed by the monitor 35 in at least one embodiment of this disclosure.

The monitor 35 displays a name 1110 of the website providing the 360-degree moving image, account information 1120, an icon 1130 for receiving the issuance request for the login key, and icons 1141, 1142, 1143, 1144, and 1145 to be used to perform a screen transition. The account information 1120 includes a user name and an email address. In at least one embodiment, the account information 1120 includes other user specific information, such as a picture, an icon, or other suitable information.

In at least one aspect, the user operates the communication terminal 200 in a normal manner. For example, the user 190 can hold the communication terminal 200 in his or her left hand, and perform an operation with his or her right hand for accessing a website for receiving distribution of the moving image. The user 190 can also input his or her user name and email address. As described above, the input operation is performed before the communication terminal 200 is mounted to the HMD 110, and hence the user 190 can easily perform the input operation.

Figure 11:
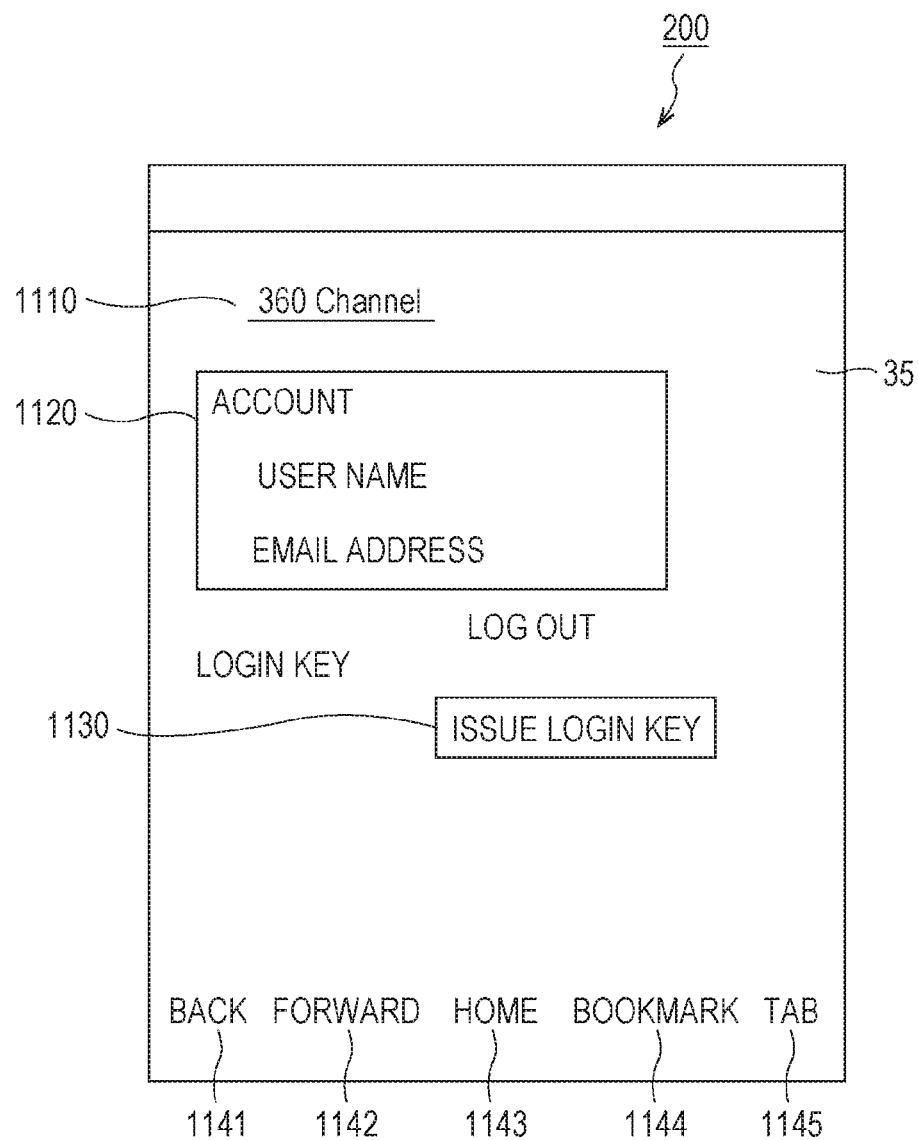
FIG. 11 is a diagram of an example of a transition of a screen displayed by a monitor 35 in at least one embodiment of this disclosure.
Figure 12:
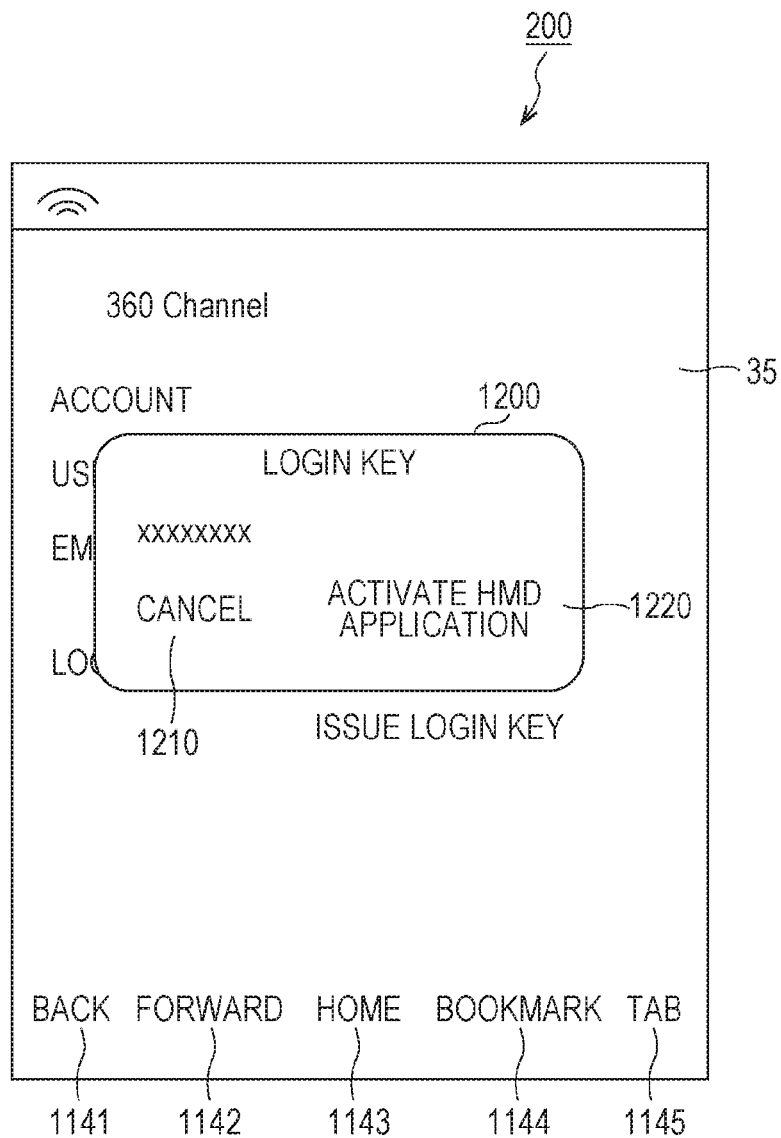
FIG. 12 is a diagram of an example of a transition of a screen displayed by the monitor 35 in at least one embodiment of this disclosure.

In FIG. 12, the communication terminal 200 has received the login key from the server 150. The user name and the email address input in FIG. 11 are transmitted to the server 150 (Step S1010). When authentication by the server 150 (Step S1010) is successful and login is complete (Step S1020), the communication terminal 200 transmits to the server 150 the issuance request for the login key (Step S1030). When the communication terminal 200 receives the login key from the server 150 (Step S1040), the communication terminal 200 displays on the monitor 35 a message in which the login key is included.

More specifically, in at least one embodiment, a message 1200 includes a login key "xxxxxxxx" and icons 1210 and 1220 for receiving commands. When the user 190 touches the icon 1220, an HMD application (i.e., second application 1002) is activated, and the monitor 35 displays a message prompting mounting of the communication terminal 200.

Figure 13:
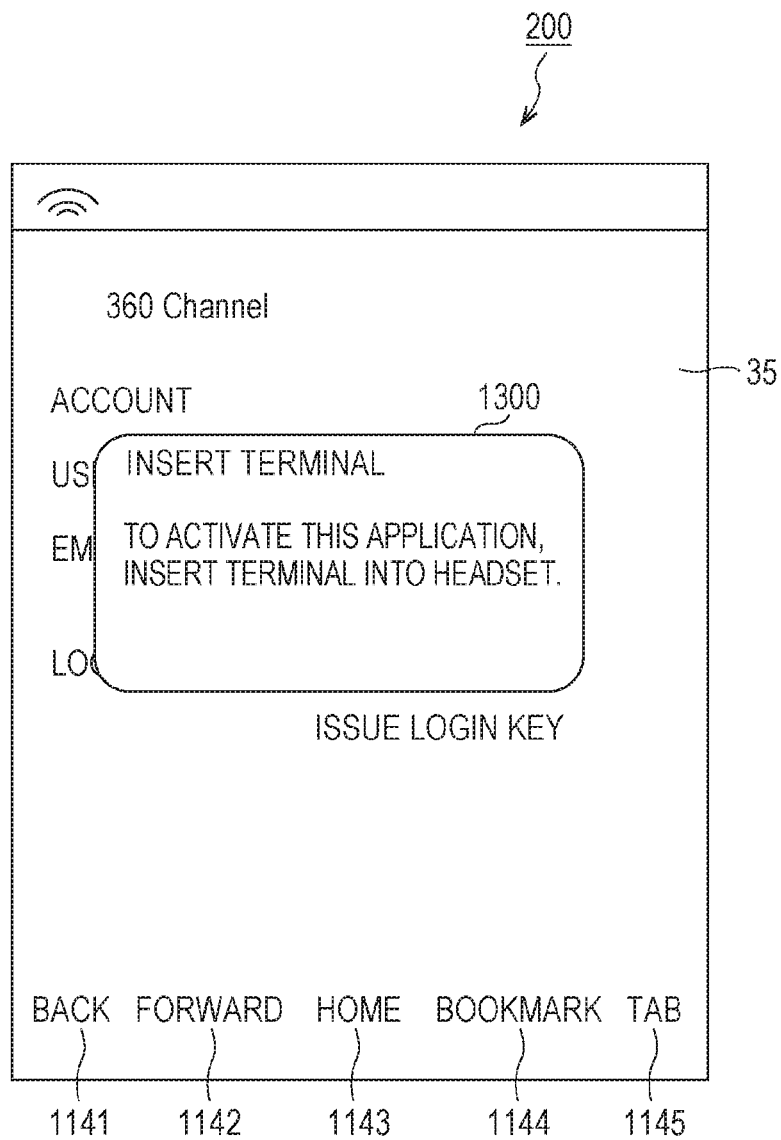
FIG. 13 is a diagram of an example of a transition of a screen displayed by the monitor 35 in at least one embodiment of this disclosure.

Specifically, in FIG. 13, the communication terminal 200 displays a message 1300 in response to the icon 1220 being touched. The message 1300 notifies the user of the communication terminal 200 to mount the communication terminal 200 to a headset (i.e., HMD 110) in order to execute the HMD application (i.e., second application 1002). When the user mounts the communication terminal 200 to the HMD 110, the communication terminal 200 switches the operating mode of the communication terminal 200 from the normal mode to the HMD mode.

Figure 14:
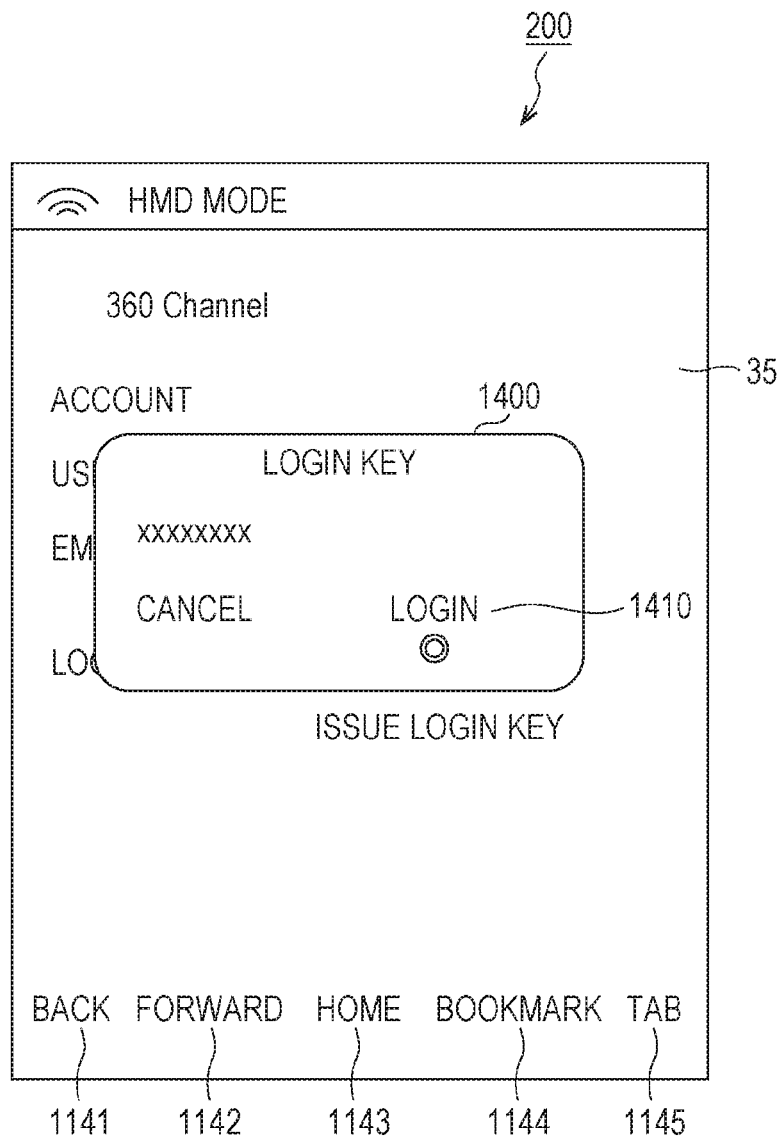
FIG. 14 is a diagram of an example of a transition of a screen displayed by the monitor 35 in at least one embodiment of this disclosure.

In other words, as in FIG. 14, the communication terminal 200 displays in the HMD mode a message 1400. The message 1400 shows that the login key received from the server 150 has been input to a predetermined field of the login screen displayed as a result of activation of the HMD application (i.e., second application 1002). An icon 1410 is used for receiving input of the login operation.

In at least one aspect, when the user 190 wearing the HMD 110 directs his or her gaze at the icon 1410, the eye gaze sensor 140 detects the position of that eye gaze. The detection result is transmitted to the communication terminal 200. The CPU 20 of the communication terminal 200 detects that the eye gaze of the user 190 is issuing a login command, and receives input of the login key. Then, the communication terminal 200 displays on the monitor 35 the moving image data received from the server 150. The direction in which the moving image is displayed changes in accordance with the direction in which the head of the user 190 wearing the HMD 110 is facing. The input trigger is not limited to detection of the eye gaze of the user 190. For example, in at least one aspect, when the user 190 executes on the controller an operation determined in advance, the CPU 20 may receive input of the login key when that operation is detected. Alternatively, when the user 190 performs a motion determined in advance under a state in which the user 190 is wearing a hand device (not shown) on his or her hand, input of the login key may be received.

As described above, according to at least one embodiment of this disclosure, the user information for logging in to an account for receiving a service, for example, the distribution of a moving image, can be input before the communication terminal 200 is mounted to the HMD 110. Therefore, input of the user information is easier than when the communication terminal 200 is mounted to the HMD 110. The information that is required in order to receive an actual service in the HMD mode can then be input after the communication terminal 200 has been mounted to the HMD 110.

At least one aspect is now described with reference to FIG. 15. Each of the first application 1001 and the second application 1002 may be executed by separate terminals. For example, the first application 1001 may be executed by the communication terminal 200, and the second application may be executed by an HMD 1500, which has an arithmetic function. The HMD 1500 includes a processor, a memory, and a communication interface. The HMD 1500 is achieved by using, in at least one aspect, hardware included in the communication terminal 200 or the server 150. Therefore, description of the hardware is omitted here.

Figure 15:
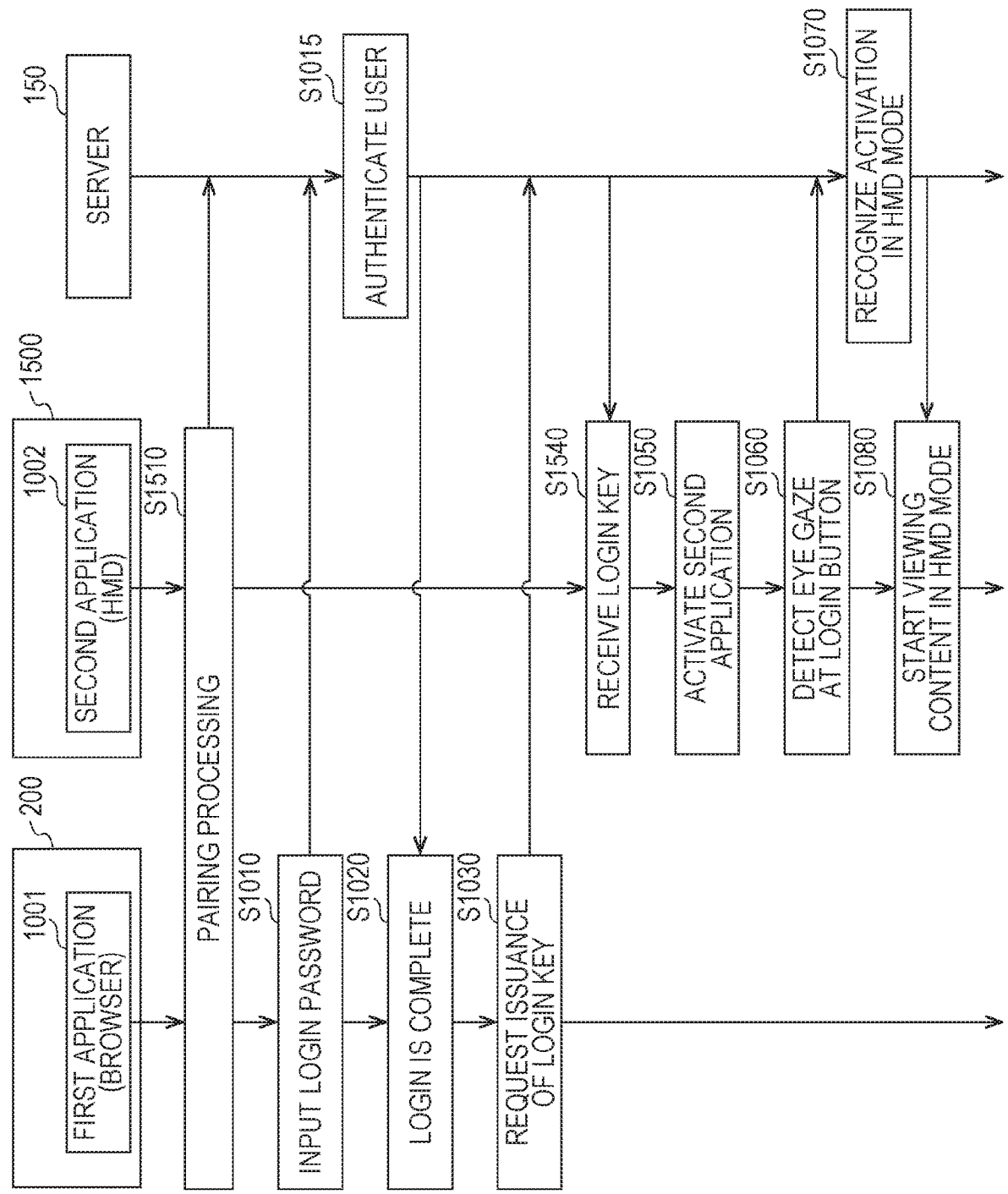
FIG. 15 is a flowchart of processing to be executed by the communication terminal 200, an HMD 1500, and the server 150 in at least one embodiment of this disclosure.

FIG. 15 is a flowchart of processing to be executed by the communication terminal 200, the HMD 1500, and the server 150 in at least one embodiment of this disclosure in at least one aspect. Processing that is the same as the processing described above is denoted by the same step number. Therefore, description of the same processing is omitted here for the sake of brevity.

In Step S1510, the communication terminal 200 and the HMD 1500 perform pairing processing. The pairing processing is achieved based on, for example, Bluetooth®® or other short-range communication. When the pairing processing is successful, the communication terminal 200 or the HMD 1500 transmits the fact that the pairing processing is complete, identification information on the communication terminal 200, and identification information on a pairing counterpart (i.e., HMD 1500) to the server 150.

In Step S1540, the HMD 1500 receives the login key from the server 150. When the HMD 1500 receives the login key, operation in the HMD mode is started, and the login key is input to a predetermined screen of the second application 1002. When the fact that the user wearing the HMD 1500 is gazing at the login button (e.g., icon 1410) is detected, the user information and the login key are transmitted to the server 150. When the server 150 recognizes activation of the HMD 1500 (Step S1070), moving image data for displaying the content selected by the user of the communication terminal 200 is transmitted to the HMD 1500. The user 190 wearing the HMD 1500 can then enjoy the content in the HMD mode (Step S1080).

In at least one aspect, the pairing processing is omitted. In this case, the server 150 can recognize the fact that the communication terminal 200 and the HMD 1500 are associated with each other.

From the above description, the disclosed technical features according to at least one embodiment can be summarized as follows.

(Configuration 1)

According to at least one embodiment of this disclosure, there is provided a method of providing content by using an HMD 110. The method includes receiving, by a CPU 20 of a communication terminal 200 configured to display a screen for logging in to an HMD application, input of user identification information by a user 190 of the application. The method further includes receiving, when authentication using the user identification information is successful, a login key for logging in to a content providing service by the application. The method further includes detecting a gaze of the user 190 wearing the HMD 110. The method further includes transmitting, based on visual recognition of the gaze on a login button (e.g., icon 1410) configured to receive a login instruction using the login key, the login key to a server 150 configured to manage the content. The method further includes receiving from the server 150 content viewable in an HMD mode based on a determination that authentication using the login key has been successful.

(Configuration 2)

According to at least one aspect of this disclosure, in addition to Configuration 1, the receiving of the login key includes transmitting, by the terminal 200, which has received input of the user identification information, an issuance request for the login key to the server 150; and receiving the login key from the server 150 in response to the issuance request.

(Configuration 3)

According to at least one aspect of this disclosure, in addition to Configuration 1 or 2, the receiving of the login key includes receiving the login key by the terminal 200. The method further includes displaying the content by the terminal 200 mounted to the HMD 110.

(Configuration 4)
According to at least one aspect of this disclosure, in addition to Configuration 1 or 2, the receiving of the login key includes receiving the login key by the HMD 110. The method further includes displaying the content by the HMD 110.

(Configuration 5)
According to at least one aspect of this disclosure, in addition to any one of Configurations 1 to 4, the receiving of the input of the user identification information includes receiving input of the user identification information before the HMD 110 is worn by the user 190.

(Configuration 6)
According to at least one embodiment of this disclosure, there is provided a system for executing any one of the above-mentioned methods.

(Configuration 7)
According to at least one embodiment of this disclosure, there is provided a content display device including a memory having a program stored thereon and a processor configured to execute the above-mentioned methods.

As described above, according to at least one embodiment of this disclosure, even when the communication terminal 200 and the HMD 1500 are separate terminals, the user can easily input login information to the communication terminal 200, then mount the communication terminal 200 to the HMD 1500, and receive distribution of data for viewing content. As a result, reduction in operability at the time of inputting the login information can be prevented.

The embodiments disclosed herein are merely examples in all aspects and in no way intended to limit this disclosure. The scope of the technical idea described in the embodiments is defined by the appended claims and not by the embodiments, and it is intended that modifications made within the scope and spirit equivalent to those of the appended claims are duly included in this disclosure.

What is claimed is:

1. A method of providing content using a head-mounted device, the method comprising:
   while in a normal mode, the normal mode corresponding to a terminal being separated from the head-mounted-device:
      generating instruction for displaying a user interface for allowing logging in to a first service on a terminal;
      generating user identification information in response to an input by a user to the user interface, wherein the user identification information associates the user with the first service;
      transmitting the user identification information to a server;
      receiving a login key for logging in to the first service in response to authentication of the user identification information by the server;
   switching an operating mode of the terminal from the normal mode to a head-mounted device (HMD) mode;
   while in the HMD mode, the HMD mode corresponding to the terminal being mounted to the head-mounted device:
      generating a login instruction in response to an input by the user to the head-mounted device following the head-mounted device worn by the user;
      in response to generating the login instruction, transmitting the login key to the server; and
      receiving content from the server, following successful authentication using the login key, wherein the content is viewable on the head-mounted device.

2. The method according to claim 1, wherein the receiving of the login key comprises:
   transmitting an issuance request for the login key to the server in response to the input by a user to the user interface; and
   receiving the login key from the server.

3. The method according to claim 2, further comprising:
   receiving the login key by the terminal; and
   displaying the content on the terminal mounted to the head-mounted device.

4. The method according to claim 1, further comprising:
   receiving the login key by the terminal; and
   displaying the content on the terminal mounted to the head-mounted device.

5. The method according to claim 1, further comprising:
   receiving the login key by the head-mounted device, and
   displaying the content on the head-mounted device.

6. The method according to claim 1, wherein the receiving of the input of the user identification information comprises receiving input of the user identification information before the head-mounted device is worn by the user.

7. The method of claim 1 further comprising displaying a first prompt on the terminal prompting a user to activate the head-mounted device in response to receiving the login key.

8. A system for providing content, the system comprising:
   a memory; and
   a processor connected to the memory, wherein the processor is configured to execute instructions stored on the memory for:
      while in a normal mode, the normal mode corresponding to a terminal being separated from a head-mounted-device:
         generating instruction for displaying a user interface for allowing logging in to a first service on a terminal;
         generating user identification information in response to an input by a user of a user ID and a password to the user interface, wherein the user identification information associates the user with a first application;
         transmitting the user identification information to a server;
         receiving a login key for logging in to the first service in response to authentication of the user identification information by the server;
         prompting the user to insert the terminal into the head-mounted device in response to successful authentication;
      switching an operating mode of the terminal from the normal mode to a head-mounted device (HMD) mode;
      while in the HMD mode, the HMD mode corresponding to the terminal being mounted to the head-mounted device:
         transmitting the login key to the server;
         receiving content from the server, following successful authentication using the login key, wherein the content is viewable on the head-mounted device.

9. The system according to claim 8, wherein the processor is further configured to execute the instructions for:
   transmitting an issuance request for the login key to the server in response to the input by a user to the user interface; and
   receiving the login key from the server.

10. The system according to claim 8, wherein the processor is further configured to execute the instructions for:

receiving the login key by the terminal; and
displaying the content on the terminal mounted to the head-mounted device.

11. The system according to claim 8, wherein the processor is further configured to execute the instructions for:
receiving the login key by the head-mounted device, and displaying the content by the head-mounted device.

12. The system according to claim 8, wherein the processor is further configured to execute the instructions for:
receiving of the input of the user identification information comprises receiving input of the user identification information before the head-mounted device is worn by the user.

13. The system according to claim 8, wherein the processor is further configured to execute the instructions for:
displaying the content by the terminal mounted to the head-mounted device.

14. The system of claim 8, wherein the processor is configured to execute instructions stored on the memory for displaying a first prompt on the terminal prompting a user to connect the terminal to the a head-mounted device in response to the input by the user to the user interface.

15. A content display device, comprising:
a head-mounted display device;
a memory; and
a processor connected to the memory, wherein the processor is configured to execute instructions stored on the memory for:
while in a normal mode, the normal mode corresponding to a terminal being separated from the head-mounted-device:
generating instruction for displaying a user interface for allowing logging in to a first service on a terminal;
generating user identification information in response to an input by a user to the user interface, wherein the user identification information associates the user with a first application;
transmitting the user identification information to a server;
receiving a login key for logging in to the first service in response to authentication of the user identification information by the server;
switching an operating mode of the terminal from the normal mode to a head-mounted device (HMD) mode;
while in the HMD mode, the HMD mode corresponding to the terminal being mounted to the head-mounted device:
transmitting the login key to the server; and
receiving content from the server following successful authentication using the login key, wherein the content is viewable on the head-mounted display device.

16. The content display device according to claim 15, wherein the processor is further configured to execute the instructions for:
transmitting an issuance request for the login key to the server in response to the input by a user to the user interface; and
receiving the login key from the server.

17. The content display device according to claim 15, wherein the processor is further configured to execute the instructions for:
receiving the login key by the terminal; and
displaying the content by the terminal mounted to the head-mounted display device.

18. The content display device according to claim 15, wherein the processor is further configured to execute the instructions for:
receiving the login key by the head-mounted display device, and
displaying the content by the head-mounted display device.

19. The content display device according to claim 15, wherein the processor is further configured to execute the instructions for: receiving of the input of the user identification information comprises receiving input of the user identification information before the head-mounted display device is worn by the user.

20. The content display device according to claim 15, wherein the processor is further configured to execute the instructions for:
displaying the content by the terminal mounted to the head-mounted display device.

21. The content display device of claim 15 further comprising a sensor configured to detect a user's gaze position based on the user's line-of-sight, wherein
the processor is further configured to log the user into the first service using the user's gaze position.

* * * * *